United States Patent [19]
McGrath et al.

[11] Patent Number: 5,939,865
[45] Date of Patent: Aug. 17, 1999

[54] RECHARGEABLE BATTERY HAVING OVERCHARGE PROTECTION CIRCUIT AND METHOD OF CHARGING RECHARGEABLE BATTERY

[75] Inventors: Francis D. McGrath, Huntington Beach; Norman D. Kellogg, Garden Grove, both of Calif.

[73] Assignee: Aspen Electronics, Inc., Huntingdon Beach, Calif.

[21] Appl. No.: 09/052,225

[22] Filed: Mar. 31, 1998

[51] Int. Cl.[6] .................................................... H02J 7/00
[52] U.S. Cl. ........................ 320/156; 320/106; 320/112; 320/160; 320/148; 320/150
[58] Field of Search ..................... 320/125, 148, 320/150, 151, 152, 155, 156, 157–159, 161, 162–164, 112, 106, 137, 160; 429/128, 7, 61

[56] References Cited

U.S. PATENT DOCUMENTS

| | | | |
|---|---|---|---|
| 5,200,689 | 4/1993 | Interriano et al. | 320/159 |
| 5,444,353 | 8/1995 | Shinohara et al. | 320/156 |
| 5,514,946 | 5/1996 | Lin et al. | 320/150 |
| 5,572,110 | 11/1996 | Dunstan | 320/106 |
| 5,576,612 | 11/1996 | Garrett et al. | 320/106 |
| 5,633,573 | 5/1997 | Van Phuoc et al. | 320/128 |
| 5,694,022 | 12/1997 | Ranta et al. | 320/156 |
| 5,708,350 | 1/1998 | Tibbs | 320/156 |

*Primary Examiner*—Peter S. Wong
*Assistant Examiner*—K. Shin
*Attorney, Agent, or Firm*—Drummond & Duckworth

[57] ABSTRACT

A rechargeable battery is provided with an overcharge protection circuit which is particularly adapted for nickel metal hydride battery packs to be used in conventional charging adapters suitable for NI-CAD battery packs. The battery pack includes a microprocessor which measures the voltage across the electrical contacts of the battery pack. Upon reaching peak charge, the microprocessor increases the voltage appearing across the battery pack contacts. After a predetermined time period as measured by the microprocessor, the microprocessor decreases the voltage appearing across the battery pack terminals to exceed the change in voltage to which the charging adapter responds to terminate a high rate of charging.

17 Claims, 4 Drawing Sheets

RECHARGEABLE BATTERY HAVING OVERCHARGE PROTECTION CIRCUIT AND METHOD OF CHARGING RECHARGEABLE BATTERY

BACKGROUND OF THE INVENTION

The present invention relates to a rechargeable battery pack of the type commonly used in video recorders, cellular telephones, power tools and the like. Even more particularly, the present invention relates to an overcharged protection circuit for a battery pack. The invention also relates to methods of recharging such battery packs.

A battery capable of being recharged after a battery is discharged through use, is commonly called a rechargeable battery. Presently, rechargeable batteries are becoming ubiquitous in present day society, and it is advantageous that the rechargeable battery always be charged to maximum capacity. Conventionally, a rechargeable battery is charged by using a base unit plugged into a wall outlet, or for smaller rechargeable batteries, by using a vehicle mounted adapter. A charger usually operates in either a standard mode, having a charging rate in coulombs (amps/second) dependant on the characteristics of the rechargeable battery, or in a trickle mode at a charging rate substantially less than in the standard mode. Until recently, most rechargeable batteries have included one or more rechargeable nickel cadmium (NI-CAD) cells comprising a rechargeable battery pack. Each of these battery packs have two external contacts for contacting the positive and negative terminals of a charging adapter.

When the user inserts a rechargeable battery into a conventional charging adapter system, the insertion of the battery is recognized and charging automatically begins. Unfortunately, when the user inserts a fully charged battery into the charging adapter, the battery voltage can actually decrease. (A decrease in battery voltage will be referred to herein as generating a $-\Delta V$, and a voltage increase will be referred to herein as generating a $\Delta V$.) In addition, overcharging of a rechargeable battery can, also result in a decrease in battery voltage $-\Delta V$. Furthermore, when a vehicle mounted adapter is used, a fully charged battery may be charged too frequently, for example each time the vehicle is started, also resulting in a decrease in battery voltage. The decrease in voltage has a memory effect in the rechargeable battery which is increased due to frequent charging, thereby reducing the lifetime of the battery.

As shown in FIG. 1 and 2, when a NI-CAD battery pack is charged by a charging adapter, the voltage across the two contacts of the battery pack generally rises until it reaches a peak voltage and then the voltage of the battery pack begins to decrease. Meanwhile, when the NI-CAD battery pack is being charged, the temperature of the battery pack initially increases relatively slowly but increases dramatically over time. There have been several attempts to produce charging adapters which terminate the high rate of charging at the peak charge, prior to the substantial voltage decrease stemming from overcharging. Early attempts were directed to charging adapter systems which terminated the high rate of charging based upon the temperature of the rechargeable battery pack. These systems included a thermostatic switch located in close proximity to the battery pack which measured the temperature of the battery. Once the battery pack heated to a predetermined temperature, the thermostatic switch would sense the battery temperature and terminate the high rate of charge to the battery pack.

More recent attempts to terminate the charging of a battery pack near the peak charge are based on the detection of a decrease in voltage $(-\Delta V)$ in the battery pack. The high rate of charge is terminated when the voltage peaks at a maximum and then drops by a predetermined voltage level, as shown in FIG. 1 as $-\Delta V$.

Such conventional charging adapters work sufficiently well with NI-CAD battery packs. However, these charging adapters, which terminate the high rate of charging based upon a $-\Delta V$, do not prevent overcharging of more recently developed forms of battery packs such as nickel metal hydride rechargeable battery packs. As shown in FIG. 3, the voltage across the two contacts of a nickel metal hydride battery pack increases gradually. Immediately prior to peak voltage, the rate of voltage increasing over time itself increases. This change in the rate of voltage increase will hereinafter be referred to as $\Delta^2 V/\Delta t^2$. As understood by those skilled in the art, $\Delta^2 V/\Delta t^2$ represents the second derivative of the measured voltage across the contacts of the battery pack with respect to time. After the nickel metal hydride battery reaches peak charge, the battery pack voltage drops relatively slowly. As seen by a comparison of the plots of FIGS. 1 and 3, nickel metal hydride battery packs do not tend to drop in voltage nearly as quickly as a NI-CAD battery pack because typical nickel metal hydride battery packs take longer to drop in voltage after obtaining peak charge. Thus, conventional adapters do not terminate the high rate of charge quickly enough to prevent overcharging of the nickel metal hydride battery. Furthermore, as shown in FIG. 3, the temperature of a nickel metal hydride battery continues to rise steadily during charging. If a charging adapter does not terminate its charge soon after a nickel metal hydride battery reaches peak charge, the battery can be damaged from overheating. Accordingly, it has become generally preferred to terminate the high rate of charge to a nickel metal hydride battery pack by sensing the battery pack temperature and terminating the high rate of charge when the temperature reaches a threshold temperature. This necessitates the need for separate charging adapters for NI-CAD battery packs and nickel metal hydride battery packs resulting in a duplicity of costs. Thus, it would be advantageous if both NI-CAD battery packs and nickel metal hydride battery packs could be charged from a single charging adapter.

To this end, U.S. Pat. No. 5,708,350 discloses a nickel metal hydride pack which may be charged from the conventional charging adapters originally intended for charging NI-CAD battery packs. The nickel metal hydride battery pack includes an overcharge protection circuit which artificially transmits an increased $\Delta V$ to the charging adapter once the nickel metal hydride pack reaches a threshold temperature. The overcharged protection circuit includes a temperature responsive switch coupled between the battery pack contacts and the rechargeable cells. Upon the temperature response switch reaching a threshold temperature, the switch adjusts the voltage appearing across the contacts of the rechargeable battery by an amount exceeding the predetermined change in voltage to which the adapter responds. The voltage across the contacts is increased by inserting a resistor into the current path. The resistor acts as a current limiter which eventually drops the battery temperature below the temperature which caused the switch to activate. Once the battery temperature drops below this predetermined threshold level, the thermostatic switch removes the resistor from the circuit and the voltage appearing across the contacts of the battery pack artificially drops. Thus, the overcharged protection circuit of U.S. Pat. No. 5,708,350 tricks a conventional charging adapter to terminate the high rate of charge even though the requisite voltage drop appearing across the battery contacts may not have occurred.

This system suffers from several drawbacks. First, where the battery pack has been placed in a cold environment prior to insertion into the charging adapter, the thermostatic switch will not operate properly when the nickel metal hydride battery reaches peak voltage. Furthermore, depending on the ambient conditions surrounding the charging adapter, and the characteristics of the thermostatic switch, it may take an unacceptably long time for the thermostatic switch to both artificially increase the battery pack voltage and then artificially decrease the battery pack voltage resulting in overheating and overcharging of the nickel metal hydride battery pack.

Thus, there exists a need for a system enabling NI-CAD and nickel metal hydride battery packs to be charged in the same charging adapter. It would also be highly desirable to provide a nickel metal hydride type battery pack which may be effectively charged in conventional adapters which specialize in charging NI-CAD battery packs.

It would also be highly desirable to provide a nickel metal hydride-type battery pack including an overcharge protection circuit which has its high charge rate terminated upon reaching its peak charge.

SUMMARY OF THE INVENTION

Briefly, in accordance with the invention, I provide a rechargeable battery pack incorporating an overcharged protection circuit. The rechargeable battery pack and protection circuit is particularly adapted for nickel metal hydride battery cells. However, the overprotection circuit of the present invention may be incorporated into any type of battery pack, including but not limited to NI-CAD battery packs.

The battery pack of the present invention includes one or more rechargeable cells configured in parallel or in series depending on the properties required of the rechargeable battery pack. The one or more battery cells are coupled to a positive electrical contact and a negative electrical contact which are positioned on the exterior of the battery pack as to permit the contacts to engage the positive and negative charging terminals of a charging adapter when the rechargeable battery pack is inserted into the charging adapter. The battery pack further includes an overcharge protection circuit including a voltage adjusting circuit, voltage measuring means, voltage controller and a timing means. Preferably, the voltage adjusting circuit comprises a resistor in parallel to a switch, all of which is in series with the positive poles of the rechargeable cells and the positive contact of the battery pack. Furthermore, in a preferred embodiment, the voltage measuring means, voltage controller and timing means are combined into a single microprocessor which is situated in parallel with the positive and negative contacts of the battery pack.

In operation, the voltage measuring means measures the voltage appearing across the positive and negative contacts of the battery pack while the voltage controller is coupled to the voltage adjusting circuit to control the operation of the switch. The switch is a typical electric switch which permits current to flow across the switch (closed circuit) or to obstruct the current flow across the switch (open circuit). While charging a rechargeable battery pack, the switch remains in the closed position. The voltage measuring means measures the voltage across the battery contacts to determine when the battery pack has reached peak charge. Upon reaching peak charge, the voltage controller opens the switch of the voltage adjusting circuit and informs the timing means as to when the switch was opened. In this manner, upon the opening of the switch, the resistence between the rechargeable cells and the positive contact is increased resulting in an increase voltage across the positive and negative contacts of the battery pack. After a predetermined amount of time, which is measured by the timing means, the voltage controller automatically closes the switch of the voltage adjusting circuit thereby resulting in a decrease in voltage ($-\Delta V$) appearing across the positive and negative contacts of the battery pack. This decrease in voltage appearing across the battery pack contacts is by an amount exceeding the predetermined change in voltage to which the charging adapter responds, resulting in the termination of the high rate of charge.

In an alternative embodiment, the microprocessor may determine peak charge by means other than by measurement of the voltage appearing across the contacts of the battery pack. For example, the microprocessor of the present invention may include a temperature measurement means, timing means and voltage controller wherein the switch of the voltage adjusting circuit is opened upon the battery pack reaching a predetermined temperature, and thereafter closing after a predetermined time period. However, in the preferred embodiments, the voltage adjusting circuit is operated based upon measurements of voltage.

In an additional preferred embodiment, the switch of the voltage adjusting circuit is only opened and thereafter closed after a predetermined time once three criteria are met. In particular, it is preferred that the microprocessor, comprising the voltage measurement means, voltage controller and timing means, opens the switch of the voltage adjusting circuit only after 1) the voltage appearing across the positive and negative contacts of the battery pack first reaches a threshold voltage; 2) the microprocessor thereafter measures an increase in the change in voltage over time ($\Delta^2 V/\Delta t^2$) typical for nickel metal hydride batteries; and 3) the microprocessor thereafter measures the change in voltage with respect to time ($\Delta V/\Delta t$) being equal to or less than zero. Once these three criteria are met, the voltage controller of the microprocessor opens the switch of the voltage adjusting circuit thereby increasing the voltage appearing across the positive and negative contacts of the rechargeable battery pack. After a predetermined time, as measured by the timing means of the microprocessor, the voltage controller closes the switch, thereby decreasing the voltage appearing across the positive and negative contacts of the battery pack. The decrease in voltage is sufficient to which the charging adapter responds to terminate the high rate of charge.

In accordance with the present invention, it is a principal object to provide an improved rechargeable battery pack and method of charging the same.

It is another object of the invention to provide a rechargeable battery pack incorporating an overcharged protection circuit permitting nickel metal hydride batteries to be charged in conventional charging adapters typically used for charging NI-CAD batteries.

It is still another object of the invention to provide a battery pack incorporating an overcharged protection circuit which terminates the high rate of charge to a battery pack upon the battery pack reaching peak charge.

These and other and more specific objects and advantages of the invention will be apparent to those skilled in the art from the following detailed description taken in conjunction with the drawings.

DETAILED DESCRIPTION OF THE PREFERRED EMBODIMENTS

Figure 1:
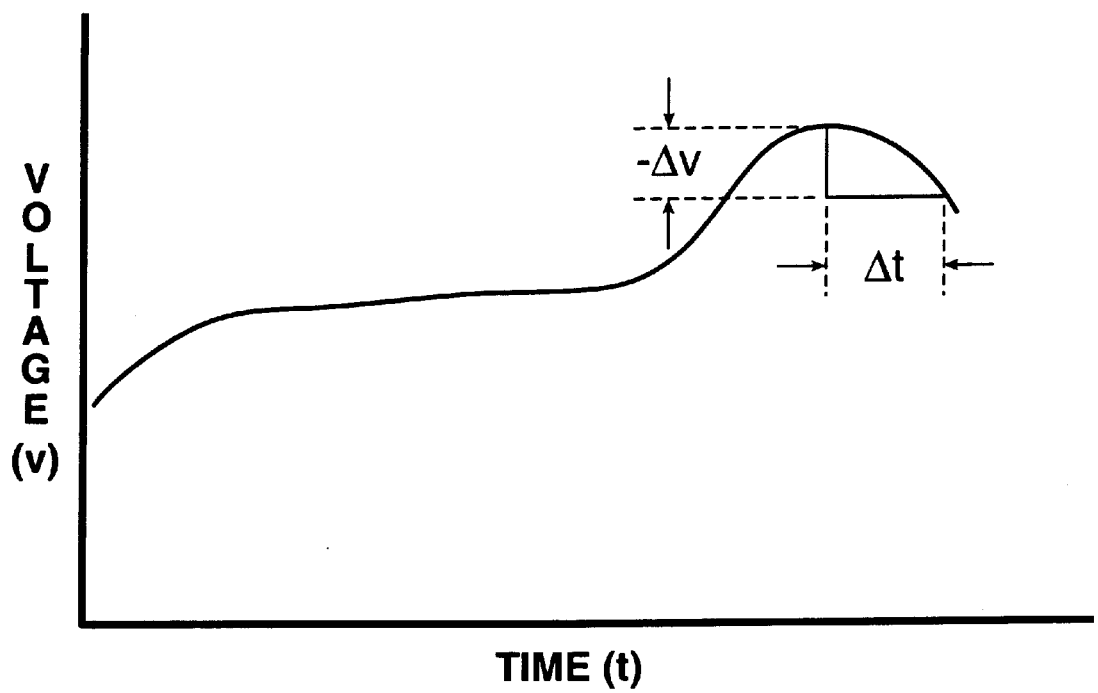
FIG. 1 is a graph showing charging voltage versus time for a typical NI-CAD battery pack.
Figure 2:
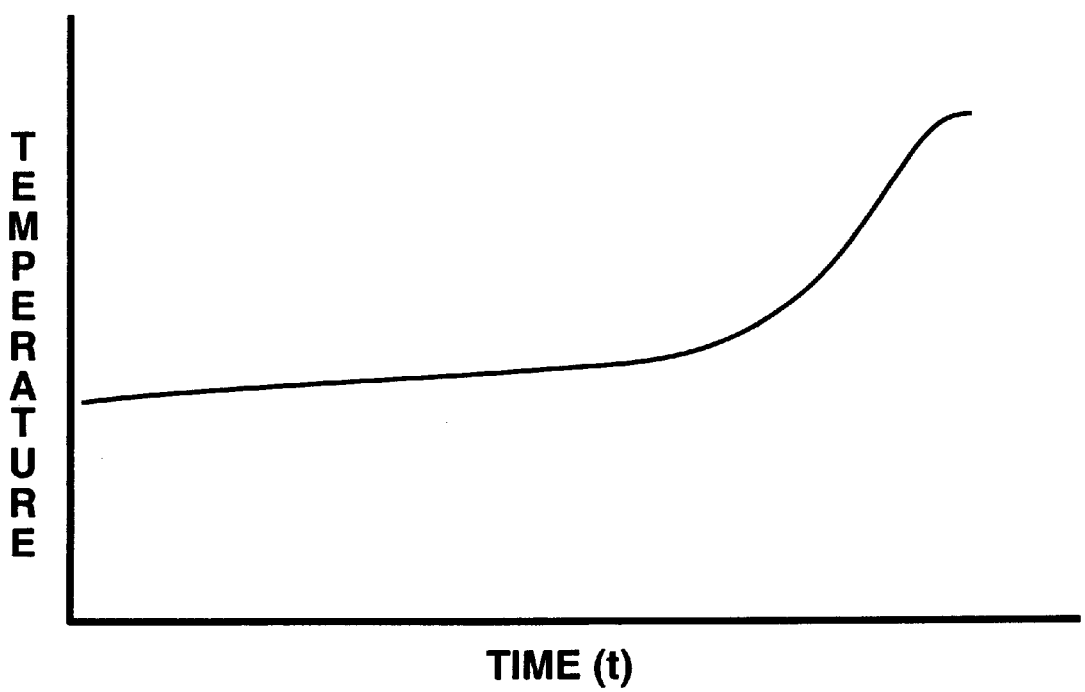
FIG. 2 is a graph showing battery pack temperature versus time for a typical NI-CAD battery pack.
Figure 3:
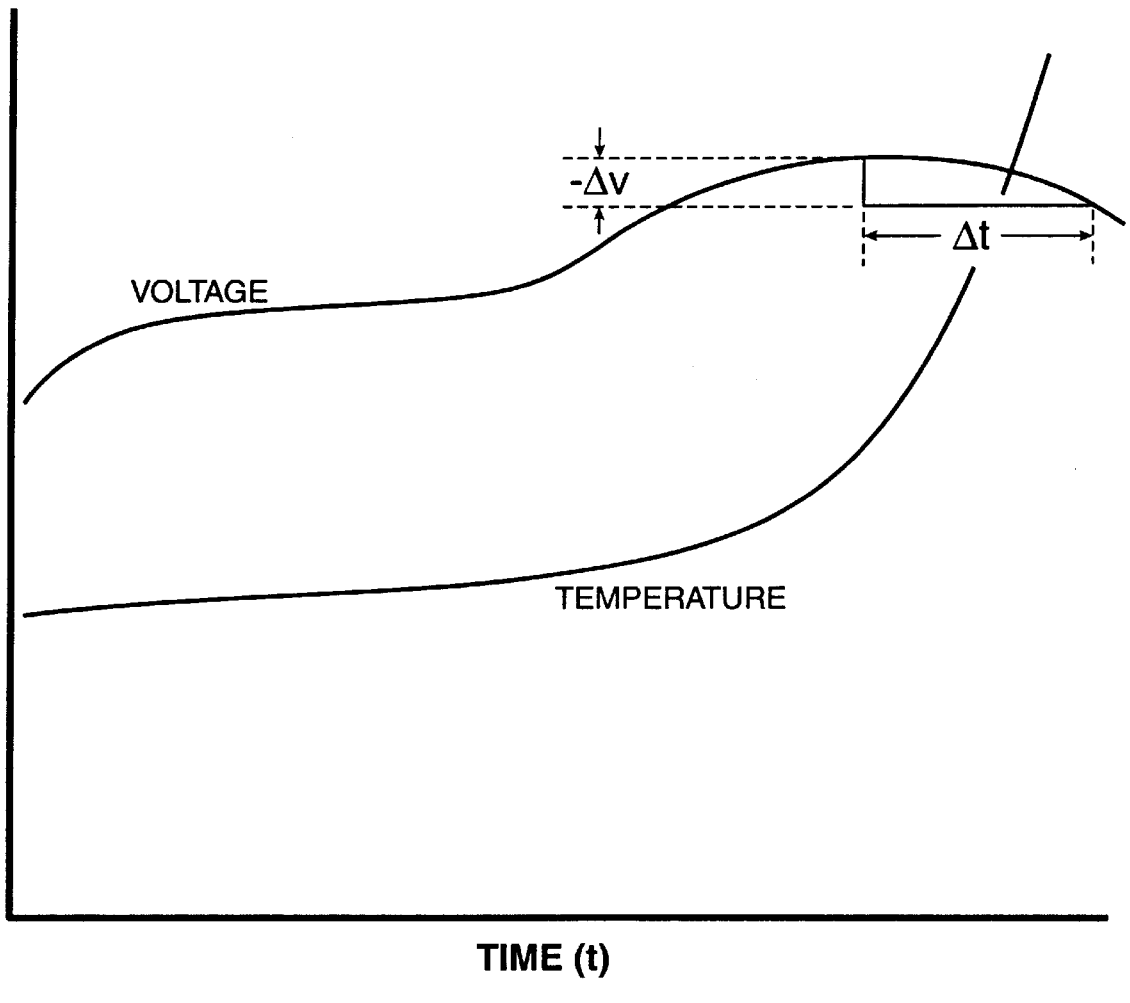
FIG. 3 is a graph showing both charging voltage versus time and battery pack temperature versus time for a typical nickel metal hydride type battery pack.

While the present invention is susceptible of embodiment in various forms, as shown in the drawings, hereinafter will be described the presently preferred embodiments of the invention with the understanding that the present disclosure is to be considered as an exemplification of the invention, and is not intended to limit the invention to the specific embodiments illustrated.

Figure 4:
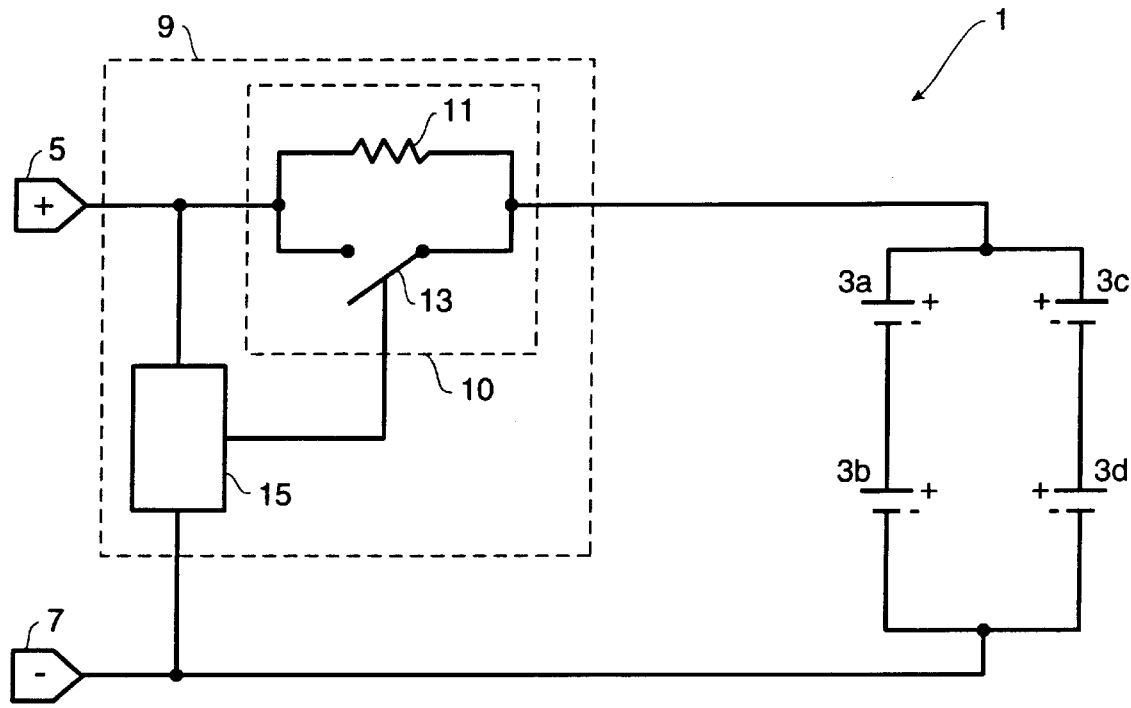
FIG. 4 is an electrical circuit diagram of a battery pack including the overcharge protection circuit of the present invention in which the switch of the voltage adjusting circuit is in an open position.
Figure 5:
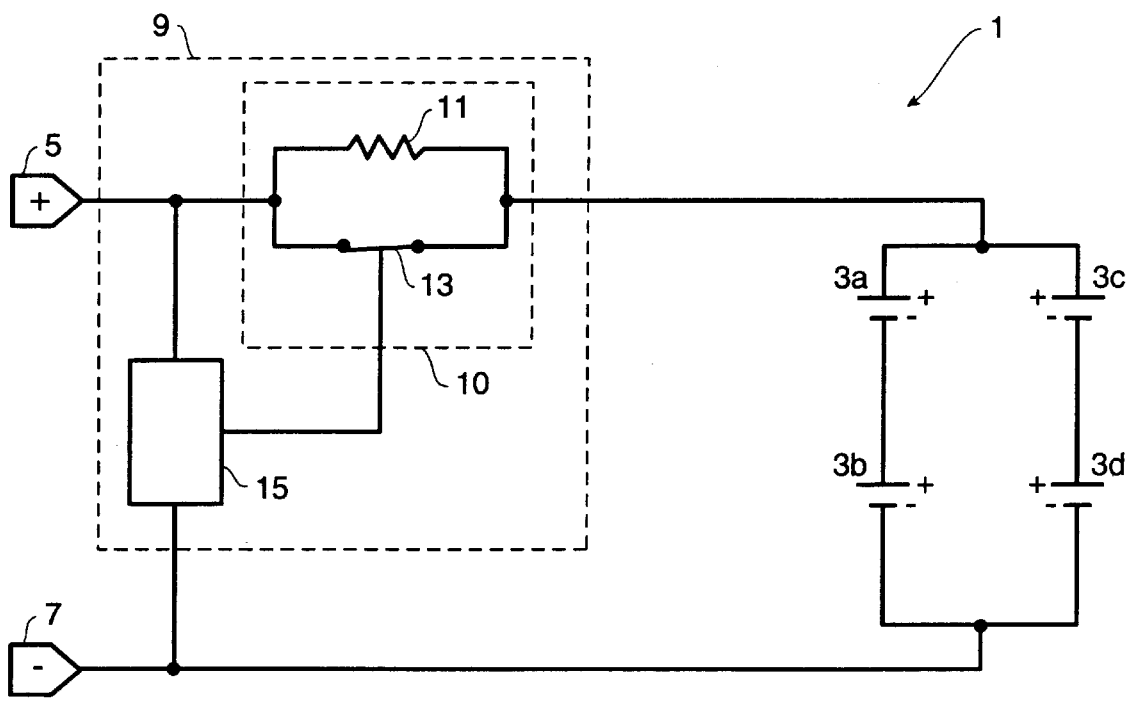
FIG. 5 is an electrical diagram of a battery pack including the overcharge protection circuit of the present invention in which the switch of the voltage adjusting circuit is in a closed position.

Referring to FIGS. 4 and 5, the rechargeable battery pack 1 of the present invention includes one or more rechargeable cells 3a–3d which are preferably a nickel metal hydride cells, such as nickel metal hydride. The rechargeable cells may be in series or in parallel depending on the electrical properties required of the battery pack. As shown in FIGS. 4 and 5, a first cell 3a is in series with second cell 3b, having the positive terminal of 3b connected to the negative terminal of cell 3a. Similarly, third and fourth cells 3c and 3d are connected electrically in series, with the positive terminal of 3d connected to the negative terminal of cell 3c. Cells 3a and 3b are configured in parallel with cells 3c and 3d forming positive pole 5 and negative pole 7 which are electrically coupled to the battery pack's positive contact 6 and negative contact 8, respectively. The positive and negative contacts are formed on the exterior of the battery pack for contacting the positive and negative terminals of a charging adapter (not shown) when a user inserts a battery pack into the charging adapter.

The battery pack of the present invention further includes an overcharge protection circuit 9 including a voltage adjusting circuit 10 and a microprocessor 15 or the like for determining the battery pack's peak charge. In a preferred embodiment, the voltage adjusting circuit includes a resistor 11 in parallel to a switch 13 located between the positive pole of the rechargeable cells and the positive contact of the battery pack. In operation, the switch 13 of the voltage adjusting circuit 10 is positioned to be closed to permit current to flow there through. Upon the battery pack reaching peak charge, the microprocessor 15 opens the switch 13 of the voltage adjusting circuit thereby increasing the resistence between the rechargeable cells and the positive contact of the battery pack and increasing the voltage appearing across the positive and negative contacts of the battery packs. After a predetermined amount of time, as measured by the microprocessor, the microprocessor automatically closes the switch of the voltage adjusting circuit thereby resulting in a decrease in voltage appearing across the positive contact 6 and negative contact 8. The resistor 11 of the voltage adjusting circuit is sufficiently great as to first, increase the voltage appearing across the battery pack contacts, and to secondly, decrease the voltage appearing across the battery pack contacts as to exceed the predetermined change in voltage to which conventional charging adapters for use with NI-CAD batteries would respond, resulting in the termination of the high rate of charge of the battery pack.

In another preferred embodiment, the voltage adjusting circuit is a transistor which can be operated as an electronically controlled switch. For example, certain transistors, known as field effect transistors (FET), can be used to open or close or cause the resistance of a circuit. These field effect transistors have low resistance drain to source when the circuit is closed. This low resistance drain results in less voltage drop across the transistor, less power dissipation, and less resulting production of heat. Furthermore, present day field effect transistors have advantages of requiring very little current to turn "on" and being very small in size. Preferred field effect transistors can be purchased from International Rectifier under the designation IRF7416.

In a preferred embodiment, the microprocessor 15 determines the peak charge of the battery pack based upon measurement of the battery pack's temperature over time. For this embodiment, the microprocessor is connected to a thermometer or temperature measure device (not shown) which measures the temperature of the battery pack. Upon the battery pack reaching a predetermined temperature increase over time, the microprocessor 15 opens the switch 13 of the voltage adjusting circuit. After a predetermined amount of time, the microprocessor then closes the switch of the voltage adjusting circuit thereby terminating the high rate of charge to the battery pack 1.

In an additional preferred embodiment, the microprocessor 15 includes a voltage measuring means, a voltage controller and a timing means (all not shown). The voltage measuring means measures the voltage across the positive and negative contacts of the battery pack to determine when the battery pack has reached peak charge. Upon reaching peak charge, the voltage measuring means initiates the voltage controller to open the switch 13 of the voltage adjusting circuit 10 and initiates the operation of the timing means. Once the timing means has recorded that a predetermined amount of time has passed, the timing means initiates the voltage controller to automatically close the switch of the voltage adjusting circuit to decrease the voltage ($-\Delta V$) appearing across the positive and negative contacts of the battery pack. Since the resistance is sufficiently great in resistor 11, the decrease in voltage appearing across the battery pack contacts operates to terminate the high rate of charging by the charging adapter.

Figure 6:
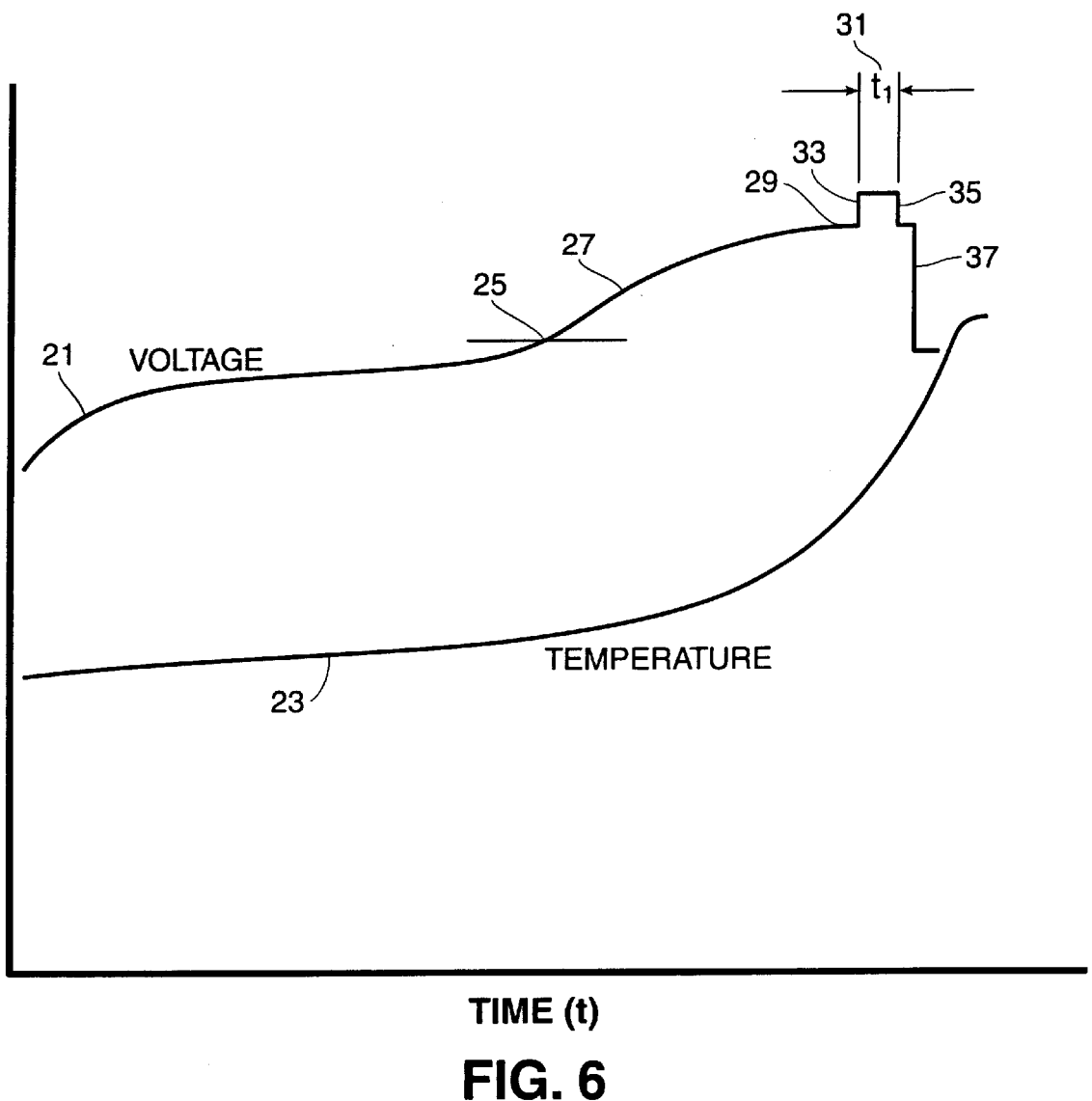
FIG. 6 is a graph showing both charging voltage versus time and battery pack temperature versus time for a nickel metal hydride-type battery pack including the overcharge protection circuit of the present invention.

In still another preferred embodiment, the microprocessor 15, comprising the voltage measurement means, voltage controller and timing means, opens the switch of the voltage adjusting circuit 10 only after three criteria have been met. As shown in FIG. 6, the temperature 23 of a typical nickel metal hydride battery increases steadily over time. During charge the voltage of a nickel metal hydride battery typically increases steadily until reaching a point 27 where the change in voltage over time increases ($\Delta^2 V/\Delta t^2$) typical for nickel metal hydride batteries. Soon after undergoing this increase in the change of voltage over time, the charge rate of the battery pack reaches its peak charge 29 where the change in voltage with respect to time is equal to zero. After reaching the peak voltage, the voltage would continue to drop across the battery pack contacts if the high rate of charge were allowed to continue. In the preferred embodiment, the microprocessor opens the switch of the voltage adjusting circuit only after: 1) the voltage appearing across the positive and negative contacts of the battery pack, as measured by the microprocessor, reaches a threshold voltage 25; 2) the microprocessor thereafter measures an increase in the change of voltage over time ($\Delta^2 V/\Delta t^2$) typical for nickel metal hydride battery 27; and 3) the microprocessor thereafter measures the change in voltage with respect to time ($\Delta V/\Delta t$) being equal to or less than zero 29. Once these three criteria are met, the voltage controller of the microprocessor 15 opens the switch 13 of the voltage adjusting circuit 10 thereby increasing the voltage across the positive and negative contacts of the rechargeable battery pack. As shown in FIG. 6, this increase in voltage ($\Delta V$) is represented by numeral 33. After a predetermined time 31, the voltage controller closes the switch thereby decreasing the voltage 35 appearing across the positive and negative contacts of the battery pack. Since the charging adapter is responsive to terminate charging upon a decrease in voltage, charging terminates at time represented by numeral 37.

Having described my invention in such terms as to enable those skilled in the art to make and use it, and having identified the presently preferred embodiment thereof, we claim:

1. A rechargeable battery pack for use with a charging adapter having first and second electrical terminals for charging the battery pack, the charging adaptor including means for changing between high and low charging rates in response to a voltage change detected at the first and second contacts, the battery pack comprising:

at least one rechargeable cell having first and second poles;

a first electrical contact positioned for contacting the first terminal of the charging adapter, said first electrical contact being electrically coupled to said first pole of said rechargeable cell;

a second electrical contact positioned for contacting the second terminal of the charging adapter, said second electrical contact being electrically coupled to said second pole of said rechargeable cell;

a voltage adjusting circuit for increasing the voltage across the first and second electrical contacts upon receipt of a first command and for decreasing the voltage across the first and second electrical contacts upon receipt of a second command;

a timing means for measuring time; and a control means coupled to said timing means and said voltage adjusting circuit for communicating said first command to said voltage adjusting circuit, and for communicating said second command to said voltage adjusting circuit after a predetermined amount of time.

2. The rechargeable battery pack of claim 1 wherein said voltage adjusting circuit includes a resistor in parallel with a switch for opening or closing an electrical path.

3. The rechargeable battery pack of claim 1 further comprising:

a voltage measuring means for measuring the voltage of said battery pack.

4. The rechargeable battery pack of claim 3 wherein said voltage measuring means is coupled to said control means, and said control means communicates said first command to said voltage adjusting circuit upon said voltage measuring means measuring a predetermined threshold voltage.

5. The rechargeable battery pack of claim 3 wherein said voltage measuring means is coupled to said control means, and said control means communicates said first command to said voltage adjusting circuit upon a measurement of the change of battery voltage over a predetermined time period ($\Delta V/\Delta t$) being less than or equal to zero.

6. The rechargeable battery pack of claim 3 wherein said voltage measuring means is coupled to said control means, and said control means communicates said first command to said voltage adjusting circuit upon said voltage measuring means measuring an increase in the change in voltage over time ($\Delta^2 V/\Delta t^2$) being greater than a predetermined value.

7. The rechargeable battery pack of claim 1 wherein said voltage adjusting circuit is a transistor.

8. The rechargeable battery pack of claim 1 wherein said timing means and control means are provided in a single microprocessor.

9. The rechargeable battery pack of claim 3 wherein said timing means, control means and voltage measuring means are provided in a single microprocessor.

10. The rechargeable battery pack of claim 1 further comprising:

a temperature measuring means for measuring the temperature of said battery pack.

11. The rechargeable battery pack of claim 10 wherein said temperature measuring means is coupled to said control means, and said control means communicates said first command to said voltage adjusting circuit upon said temperature measuring means measuring a predetermined increase in temperature over time ($\Delta T/\Delta t$).

12. A method of recharging a battery having first and second electrical contacts using a charging adaptor having first and second electrical terminals for charging the battery pack, the charging adaptor including means for changing between high and low charging rates in response to a voltage change detected at the first and second contacts, the charging adapter also being responsive to detect the voltage across the first and second electrical contacts of the battery pack to change between first and second charging rates for charging the battery pack, the method comprising the steps of:

charging the battery pack at the first charging rate;

increasing the voltage across the first and second electrical contacts of the battery pack;

measuring the commencement of time after the voltage is increased across the first and second electrical contacts of the battery pack;

decreasing the voltage across the first and second electrical contacts of the battery pack a predetermined amount of time after first increasing the voltage appearing across the first and second electrical terminals of the battery pack; and charging the battery pack at the second charging rate in response to the decrease in voltage across the first and second electrical contacts.

13. The method of recharging a battery of claim 12 further comprising the step of:

measuring the voltage across the electrical contacts of the battery pack.

14. The method of recharging a battery of claim 13 further comprising the steps of:

detecting a predetermined threshold voltage, and the step of increasing the voltage across the first and second electrical contacts is in response to the detection of the threshold voltage.

15. The method of recharging a battery of claim 13 further comprising the steps of:

detecting an increase in the change in battery voltage over time ($\Delta^2 V/\Delta t^2$) being greater than a predetermined value, and the step of increasing the voltage across the first and second electrical contacts is in response to the detection of an increase in the change in battery voltage over time ($\Delta^2 V/\Delta t^2$) being greater than a predetermined value.

16. The method of recharging a battery of claim 13 further comprising the step of:

detecting a change in battery voltage over a predetermined time period ($\Delta V/\Delta t$) being less than a predetermined value, and the step of increasing the voltage across the first and second electrical contacts is in response to the detection of a change in battery voltage over a predetermined time period ($\Delta V/\Delta t$) being less than a predetermined value.

17. The method of recharging a battery of claim 12 further comprising the step of:

measuring the temperature of the battery pack, and the step of increasing the voltage across the first and second electrical contacts is in response to the detection of an increase in temperature over time ($\Delta T/\Delta t$) being greater than a predetermined value.

* * * * *